United States Patent [19]

Sands

[11] 4,258,941
[45] Mar. 31, 1981

[54] SERVICE CLAMP FOR PLASTIC PIPE OR THE LIKE

[75] Inventor: Robert E. Sands, Shelbyville, Ill.

[73] Assignee: Mueller Co., Decatur, Ill.

[21] Appl. No.: 58,801

[22] Filed: Jul. 19, 1979

[51] Int. Cl.³ .............................................. F16L 41/04
[52] U.S. Cl. ...................................... 285/197; 137/318
[58] Field of Search ...................... 285/197, 373, 419; 137/318

[56] References Cited

U.S. PATENT DOCUMENTS

| 45,964 | 1/1865 | Ball .................................. 137/323 X |
| 466,255 | 12/1891 | Paul . |
| 809,327 | 1/1906 | Rieske . |
| 896,333 | 8/1908 | Smith . |
| 1,487,682 | 3/1924 | Leppert . |
| 1,835,399 | 12/1931 | Hunziker . |
| 1,970,078 | 8/1934 | Dillon ................................ 151/69 X |
| 2,459,251 | 1/1949 | Stillwagon ...................... 285/373 X |
| 2,592,791 | 4/1952 | Coberly ............................ 151/69 X |
| 2,790,652 | 4/1957 | Risley et al. . |
| 3,084,958 | 4/1963 | Appleton ......................... 151/69 X |
| 3,471,176 | 10/1969 | Gilchrist . |
| 3,489,441 | 1/1970 | Malcolm . |
| 3,620,245 | 11/1971 | Finney . |
| 3,792,879 | 2/1974 | Dunmire et al. . |
| 3,999,785 | 12/1976 | Blakeley ........................... 285/197 X |

FOREIGN PATENT DOCUMENTS

| 182873 | 8/1955 | Austria ...................................... 285/419 |
| 637214 | 1/1928 | France . |
| 1200439 | 6/1959 | France . |
| 1196653 | 7/1970 | United Kingdom . |

OTHER PUBLICATIONS

Superior Utility Products, Inc., 1973, "Brass Tapping Saddle for Plastic Pipe by Superior, Style 34," 2 pages.

Primary Examiner—Thomas F. Callaghan
Attorney, Agent, or Firm—Cushman, Darby & Cushman

[57] ABSTRACT

A service clamp for use as a fitting in tapping a hole in a main pipe and/or for supporting a branch pipe, the service clamp being particularly adapted for use when the main pipe is plastic such as polyethylene (PE) or polyvinyl chloride (PVC) although it may be used with pipe made from other material including metal pipe. The service clamp comprises two saddle parts for encircling the main pipe, one of the saddle parts carrying a branch pipe extension with a throughbore, and each saddle part carrying, prior to assembly of the service clamp, at least one of the screws or bolts used during assembling the clamp about the main pipe. Additionally, one of the saddle parts is provided with a slot communicating with an unthreaded aperture in one of the flange ends of the saddle part, the slot being large enough to receive the head of the bolt or the screw carried in the other part so that the first and second saddle parts can function as a hinge clamp when assembling about the main pipe and then both bolts or screws can be tightened to uniformly apply a load to the sealing means of the service clamp.

8 Claims, 6 Drawing Figures

SERVICE CLAMP FOR PLASTIC PIPE OR THE LIKE

The present invention relates to a service clamp which functions as a hinge clamp when initially assembling the same on a main pipe and then functions as a two saddle part service clamp utilizing bolts or screws on the opposite sides of the main pipe for uniformly clamping the two saddle parts about the main pipe so as to apply a uniform load to the sealing means carried by the saddle part having a branch pipe extension thereon. While the service clamp is preferably used with plastic main pipe to obviate problems encountered with connecting branch lines to such main pipe, it may also be used with conventional metal pipe such as cast iron pipe.

BACKGROUND OF THE INVENTION

Two types of service or saddle clamps have been utilized for a number of years with main pipes when it is desired to install a branch connection and/or to tap into the pipe for connecting a future branch pipe. The first, and probably most commonly used, service clamp is the type which utilizes bolts or screws on opposite sides of the main pipe for clamping the assembly together to encompass the main pipe. While these clamps generally have one bolt or screw on each side of the clamps and are referred to as "two-bolt" clamps, they can have more than one bolt or screw if desired. This type of "two-bolt" service clamp has as its main advantage a uniform means of loading the sealing means carried by one of the saddle parts. In other words, the two saddle parts can have the screws or bolts tightened in such a manner that the saddle parts are clamped together along a line parallel to the axes of the bolts, thus applying the load uniformly to the sealing means. The main disadvantage or drawback of the two-bolt clamp is that it cannot be assembled quickly or easily about a main pipe, especially when it is necessary to utilize nuts with the bolts for drawing the two saddle parts together. Even in the situation where one of the saddle parts is provided with tapped apertures or holes for receiving bolts or screws, it will still require considerable manipulation of the parts to insert the bolts or screws into the tapped holes in the confines of a trench where the main pipe is located, especially when space for assembly is at a premium.

The second type of service clamp in considerable use today is a service clamp made up of two saddle parts and utilizing a single bolt but having a hinge between the two saddle parts so that the unit can be hinged into place and the single bolt or screw tightened. While this type of service clamp offers an advantage of easier assembly of the service clamp on the main pipe in limited space, it has a drawback in that the two saddle parts, when they are tightened about the main pipe, are pivoting on an axis parallel to the axis of the main pipe and, consequently, the sealing means carried by one of the saddle parts is unevenly loaded. There is a higher loading on the sealing means closer to the hinge axis than on the sealing means away from the hinge axis. This is especially critical when such service clamps are used on plastic main pipes since it not only puts a nonuniform load on the sealing means but, in effect, is also putting a nonuniform load on the plastic pipe which may, through cold flow, become out of round.

PRIOR ART

Prior art patents relating to service clamps utilizing two bolts for clamping the same about a pipe are as follows:

U.S. Pat. No. 15,961: Ball, Jan. 21, 1865
U.S. Pat No. 3,489,441: Malcolm, Jan. 13, 1970
Br. Pat. No. 1,196,653: Mardling, July 1, 1970
Fr. Pat. No. 1,200,439: Jayot, Dec. 21, 1959

Each of the above patents discloses service clamps which encompass a main pipe and which utilize bolts or screws on opposite sides of the saddle parts for drawing the saddle parts together so as to apply a uniform load on the sealing means. Of the above patents, Ball, Mardling and Jayot rely on a bolt and nut arrangement to clamp the saddle parts together, whereas Malcolm provides tapped holes or bores in one clamp part for receiving bolts or screws. These types of saddle clamps are difficult to assemble on the main pipe, especially in restricted spaces as the bolts or screws, and nuts when used, must be individually inserted into the saddle parts when the saddle parts are held in position about the main pipe.

The following prior art patents relate to service clamps provided with a hinge between the saddle parts:

U.S. Pat. No. 3,471,176: Gilchrist, Oct. 7, 1969
U.S. Pat. No. 3,620,245: Finney, Nov. 16, 1971

In the hinge clamps disclosed in each of Gilchrist and Finney, one saddle part is provided with an eye at one end for receiving a hook portion on the other saddle part to define the hinge about which the saddle parts pivot as the single bolt or screw is tightened. Hinge clamps have also been used where a hinge pin hinges the two saddle parts together and a single bolt or screw is used to tighten the parts about the main pipe. These arrangements, while easier to assemble on a main pipe, have the disadvantage of not providing a uniform load on the sealing means.

The following prior art patents disclose slotted arrangements for receiving bolts or screws or for holding a boltwith a particular element of a combination:

U.S. Pat. No. 466,255: Paul, Dec. 29, 1891
U.S. Pat. No. 809,327: Rieske, Jan. 9, 1906
U.S. Pat. No. 896,333: Smith, Aug. 18, 1908
U.S. Pat No. 1,487,682: Leppert, Mar. 18, 1924
U.S. Pat. No. 1,835,399: Hunziker, Dec. 8, 1931
U.S. Pat. No. 1,970,078: Dillon, Aug. 14, 1934
U.S. Pat. No. 3,792,879: Dunmire et al, Feb. 19, 1974
Fr. Pat. No. 637,214: Apr. 25, 1928

Of the immediately aforementioned patents, the Dunmire et al patent and the Hunziker patent appear most relevant, but in each instance it will be noted that it requires considerable manipulation to position the bolts or screws in place.

BRIEF SUMMARY OF THE INVENTION

Broadly stated, the present invention relates to an improvement in a service clamp which is known as a "SLIP-HINGE" (trademark of Mueller Co., Decatur, Ill.) service clamp that combines the functions of both a two-bolt service clamp or a conventional hinge service clamp and yet has none of the disadvantages of the same.

The service clamp of the present invention which is utilized for tapping a hole in a main pipe and/or supporting a branch pipe, includes first and second saddle parts, each having a curved surface substantially complementary to a portion of the surface of the main pipe and each having flanges extending from each end of the same and respectively opposing one another when the saddle parts encompass a main pipe. One of the saddle parts is provided with a branch pipe extension which defines a throughbore opening to the curved surface of that particular saddle part, and sealing means carried by the saddle part are provided around this opening for sealing a hole tapped into the main pipe. The clamping means for the first and second saddle parts of the service clamp include a first screw or bolt extending through an unthreaded aperture in one flange of the first saddle part and threaded into a threaded aperture of the opposed flange of the second saddle part and a second screw or bolt extending through an unthreaded aperture of the other flange of the first saddle part and threaded into a threaded aperture in the opposed flange of the second saddle part. The screws or bolts have heads bearing on the respective flanges of the first saddle part and, when tightened into the threaded apertures of the second saddle parts, they cause the saddle parts to apply uniform loading to the sealing means. The first saddle part is provided with a slot therein wider than the head of one of the screws or bolts and communicating with one of the unthreaded apertures, and this permits the screw or bolt to be partially threaded into the threaded aperture of the opposed flange of the second saddle part and then inserted through the slot and positioned in the unthreaded aperture communicating therewith so that the first saddle part is hinged into position with respect to the second saddle part around the main pipe and then the second screw may be threaded into the other unthreaded aperture in the other end of the second part whereby the two saddle parts can be drawn together to apply a uniform load on the sealing means.

In one aspect of the present invention, the bolt or screw whose head is to be inserted through the slot in the first saddle part is staked in the threaded aperture of the second saddle part so that it cannot be unthreaded therefrom. Preferably, the staking is accomplished by flaring the end of the shank of the screw or bolt, although the threads adjacent the end of the screw or bolt could be disfigured.

In another aspect of the present invention, the screw or bolt which is inserted through the unthreaded aperture of the flange of the first saddle part may be held in position prior to the assembly of the two saddle parts by friction means which may preferably be a plastic or fiber disc having an outside diameter greater than the diameter of the unthreaded aperture and a hole therethrough with a diameter substantially equal to the root diameter of the screw or bolt. Friction of the disc on the screw or bolt retains the same so that the screw or bolt cannot slip from the unthreaded aperture.

A still further aspect of the present invention includes providing the branch pipe extension on the first saddle part and also providing the first saddle part with the slot communicating with an unthreaded aperture of one of its flanges so that when the two saddle parts are assembled about a main pipe, the bolt or screw heads face upwardly and are easily accessible to the person installing the clamp.

These and other objects and advantages of the present invention will appear more fully in the following Drawings, Detailed Description of the Invention and Claims.

DETAILED DESCRIPTION OF THE INVENTION

Figure 1:
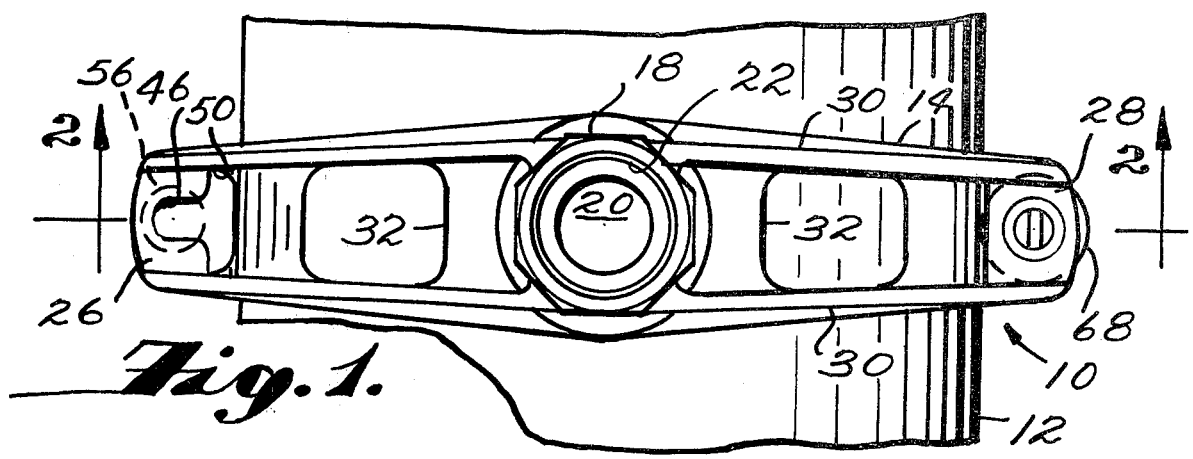
FIG. 1 is a top plan view of the service clamp of the present invention and showing the upper saddle part in position on the main pipe with the screw or bolt on the left side omitted for the purpose of clarity.
Figure 2:
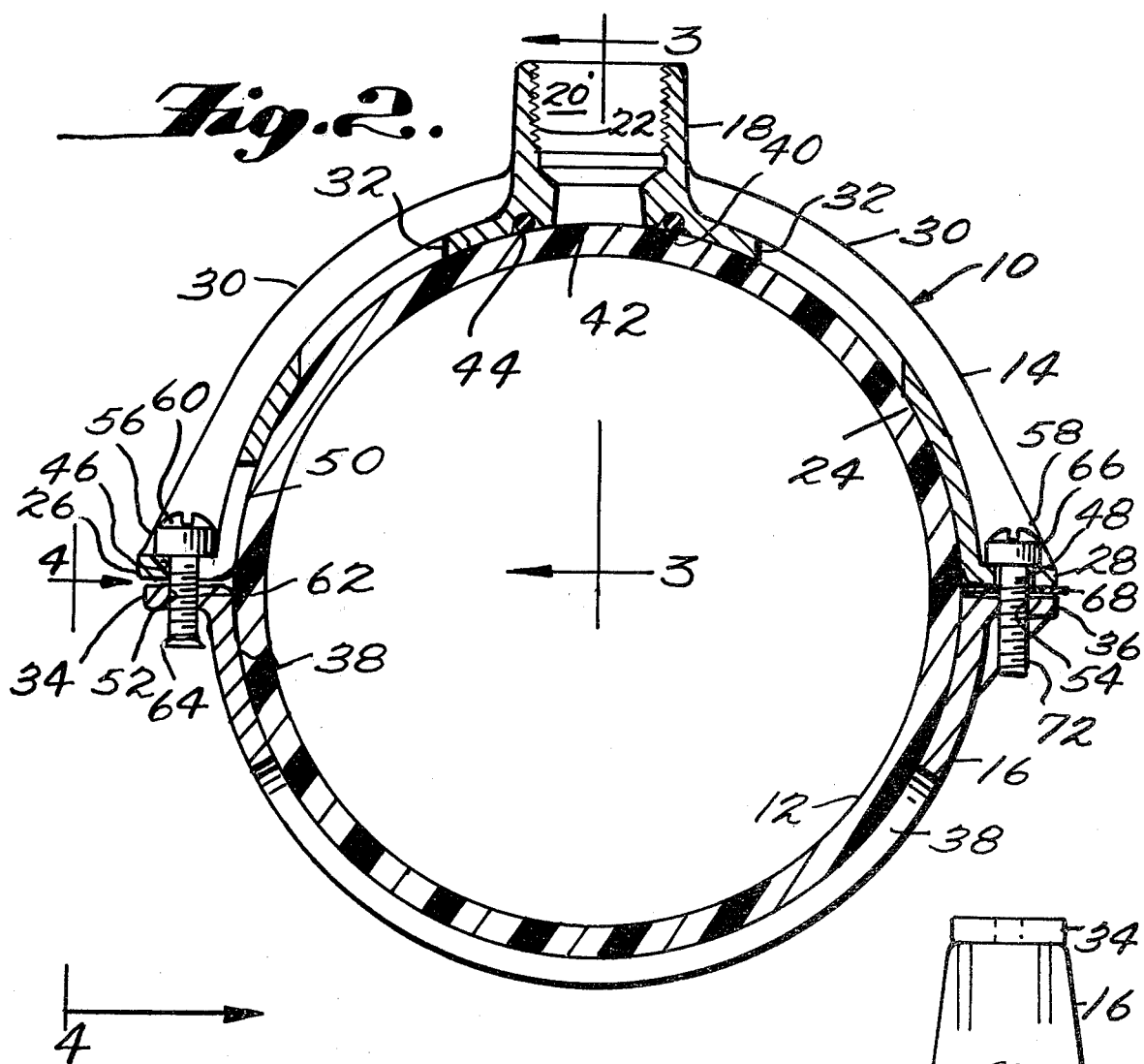
FIG. 2 is a sectional view of the service clamp of the present invention taken on the line 2—2 of FIG. 1 and illustrating the saddle parts tightly encompassing the main pipe and both screws or bolts in position.
Figure 4:
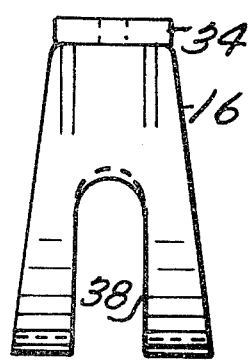
FIG. 4 is a vertical elevational view taken substantially on the line 4—4 of FIG. 2 and illustrating the second or lower saddle part.
Figure 3:
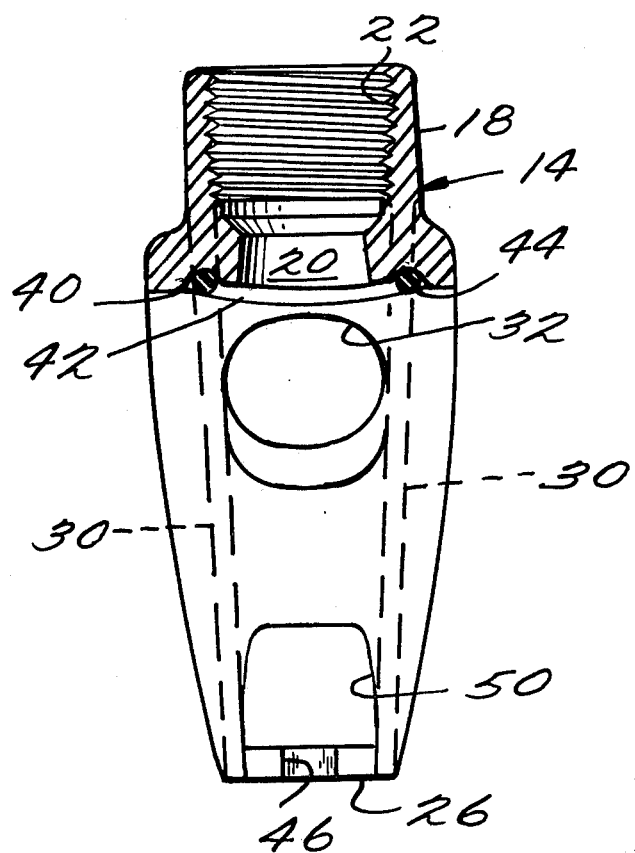
FIG. 3 is a vertical sectional view taken substantially on the line 3—3 of FIG. 2 and showing the first or upper saddle part.

Referring now to the drawings wherein like characters or reference numerals represent like and similar parts, there is disclosed in FIG. 1 a service clamp or fitting, generally designated at 10, of the present invention which is adapted for use in tapping a hole in a main pipe 12 and/or for supporting a branch pipe which may be subsequently used. The service clamp 10 is particularly adapted for use with main pipes 12 which are made of a plastic material such as polyethylene (PE) or polyvinyl chloride (PVC) but it will be appreciated by those skilled in the art that the service clamp 10 could also be used with main pipes made from other materials such as cast iron or copper pipe.

The service clamp 10 comprises a first or upper saddle part 14 and a second or lower saddle part 16, one of the saddle parts 14 or 16 being provided with a radially outwardly extending branch pipe extension 18 having a throughbore 20 which may be at least partially threaded as indicated at 22 for receiving a tapping tool or a perforator such as disclosed in the aforementioned U.S. Pat. No. 3,620,245. The branch pipe may be welded to the extension 18 or extension 18 can be provided with exterior threads (not shown) for receiving interior threads of a branch pipe.

The first or upper saddle part 14, which is shown in the drawings as being provided with the branch extension 18, is generally arcuate in shape and is provided with an interior curved surface 24 substantially complementary to a portion of the surface of the main pipe 12. The ends of the arcuate first saddle part 14 are provided with oppositely disposed flanges 26 and 28 which extend longitudinally in a direction along the axis of the main pipe 12 when the saddle part 14 is positioned on the main pipe. Arcuate stiffening ribs 30 are provided on the first saddle part and are spaced relative to a vertical axis of the saddle part so that holes 32 may be provided to reduce the weight and amount of material used for the saddle part. The second or lower saddle part 16 is also arcuate shaped, but it is in strap form and is provided at its ends with a pair of oppositely disposed flanges 34 and 36 which also extend longitudinally in a direction along the axis of the main pipe 12. The second saddle part 16 is provided with a curved inner surface 38 substantially complementary to a portion of the curved surface of the main pipe 12, and when the saddle part 16 is placed on the main pipe 12, its flanges 34 and 36, respectively, oppose the flanges 26 and 28 of the first saddle part 14. The saddle part 16 is provided with an elongated cut-out portion 38 for the purpose of reducing the weight and amount of material of the same.

Both saddle parts 14 and 16 are preferably made of brass, although they could be made of steel, cast iron or other metals or alloys.

The first or upper saddle part which is provided with the branch extension 18 has an annular groove 40 in its curved surface 24 surrounding the opening 42 of the throughbore to the curved surface 24, and the groove 40 is arranged to receive an elastomeric sealing means 44 for sealing around the area where the hole is to be tapped or is tapped in the main pipe 12. The sealing means may be an O-ring, such as shown in the aforementioned U.S. Pat. No. 3,620,245, or it may be a gasket ring, such as shown in the common assignee's U.S. Pat. No. 3,840,255, issued Oct. 8, 1974, to Joseph L. Daghe. Additionally, the lower saddle part 16 may be provided with a support gasket which extends between the opposed flanges 26 and 34 and 28 and 36, respectively, also as shown in the aforementioned U.S. Pat. No. 3,840,255.

Referring now to FIGS. 2, 3, 5 and 6, it will be noted that the flanges 26 and 28 are provided with unthreaded apertures or holes 46 and 48. The aperture 48 is in the form of a bore through the flange 28, whereas the unthreaded aperture 46 is elongated in a direction towards the curved first saddle part 14. The curved portion of the saddle part 14 adjacent the flange 26 is provided with an elongated slot 50 in the direction of the curved portion of the saddle part 14 and slightly less than the width of the saddle part 14, the slot 50 being in open communication at its lower end with the unthreaded aperture 46. A more detailed explanation of the purpose of the slot 50 will follow later in the specification.

The flanges 34 and 36 of the second saddle part 16 are respectively provided with threaded apertures 52 and 54, these apertures being arranged to threadedly receive the bolts or screws 56 and 58, respectively. It will be noted by reference to FIGS. 2 and 5 that the screw 56 is provided with a head 60 and a threaded shank 62, the shank 62 having a crest diameter slightly smaller than the width of the slot 46 in the flange 26 of the first saddle part 14, whereas the head has a diameter greater than the width of the aperture 46 so that it can bear on the surface of the flange 26. Additionally, it will be noted that the screw 56 is staked to the second saddle part 16 by flaring the end of the shank 62, as shown at 64, in FIGS. 2 and 5, so that the screw 56 can never be unthreaded from the threaded aperture 52 of the second saddle part 16. While the staking is preferably done by flaring the end of the shank 62 of the screw 56, as shown at 64, it can also be accomplished, if desired, by mutilating or disfiguring the end threads of the shank 62. The head 60 of the screw 56 has a diameter less than the longitudinal width of the slot 50 in the curved portion of the saddle part 14 so that it may be slipped through the slot 50 to position the same in the aperture 46.

Figure 6:
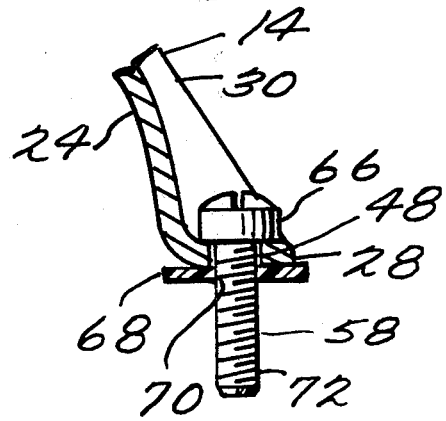
FIG. 6 is an enlarged fragmentary sectional view of the flanged end of the first saddle part opposite to the one which has an aperture communicating with the slot therein, the view showing the means for retaining the screw or bolt with the upper or first saddle part.

The screw 58 is similar to the screw 56 except that it is not staked to the second saddle part 16. In this respect, the screw 58 which has a head 66 for bearing on the flange 28, is retained in the unthreaded aperture 48 of the first saddle part by providing a disc 68 having a hole 70 therethrough of a diameter substantially equal to the root diameter of the shank 72 of screw 58. The disc 68, which is plastic or fiber, is frictionally held on the threads of the shank 72. As best shown in FIG. 6, the disc 68 and head 66 of the screw 58 capture the flange 28 therebetween and, thus, the screw 58 is retained with the first saddle part 14.

Figure 5:
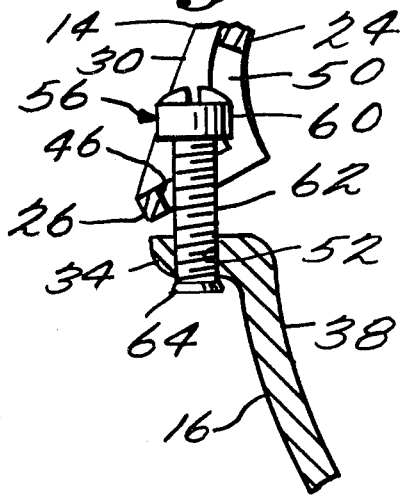
FIG. 5 is an enlarged fragmentary sectional view illustrating the assembly of the first saddle part to the second saddle part by inserting the bolt or screw head through the slot in the first saddle part to position the shank of the bolt or screw in the unthreaded aperture when the first and second saddle part encompass the main pipe.

The service clamp 10 is shipped to the customer partially assembled in that the screw 58 is at least partially screwed into the threaded aperture of the lower or second saddle part 16, with the screw 56 being substantially properly positioned in the unthreaded aperture 60. When the customer desires to assemble the service clamp 10 around the main pipe 12, the screw 58 is backed completely out of the threaded aperture 54 of the second saddle part 16, but is retained with the first saddle part 14 because of the disc 68. The service clamp may then be opened up similar to a conventional hinge clamp, although the hinging action in this case is a slip action, as shown in FIG. 5. Once the service clamp 10 has been opened up and then positioned about the main pipe so as to circumscribe the same, then screw 58 can be threaded back into the threaded aperture 54, and both screws 56 and 58 can then be tightened as a two-bolt service clamp so that a uniform pressure is applied to the sealing means 44.

While in the immediately preceding paragraph, it is indicated that the two saddle parts 14 and 16 remain together in a hinged condition once the screw 58 has been backed out of the threaded aperture 54, and then the two parts are hinged about the main pipe, it is also possible for the two saddle parts 14 and 16 to be completely separated prior to assembly on the main pipe 12. Of course, the screws 56 and 58 remain respectively with the saddle parts 16 and 14. In this operation, the lower or second saddle part is placed about the main pipe 10 and because of the slot 50 in the upper saddle part 14, the upper saddle part 14 can be manipulated so that the slot 50 receives the head 60 of the screw 56 to allow the screw 56 to be received in the elongated unthreaded aperture 46. Then the hinge feature of the design comes into effect, and the first saddle part 14 and the second saddle part 16 can be brought together to a position where the screw 58 can be started into the threaded aperture 54 with both screws 56 and 58 then being tightened to apply the uniform load on the sealing means 44.

The arrangement of service clamp 10 just described provides for ease of assembly of the same about the main pipe 12 just as in a conventional hinge design but with even more flexibility. However, the saddle clamp 10 of the present invention does not have the disadvantages of the conventional hinge saddle clamp. The two saddle parts are pivoted about an axis when tightening the same on the main pipe 12. Two screws are used to evenly apply the clamping action of the saddle parts 14 and 16 onto the pipe, thus resulting in uniform loading by the clamp on the sealing ring. Because of the flexibility of movement of the hinge resulting from the elongated and wide slot 50, this permits the saddle parts 14 and 16 to be rotated up or down, rotated sideways or moved up or down as the hinge area can be lengthened. This flexibility facilitates the ease of assembly, but especially in starting the screw 58 in the threaded aperture or hole 54, and such flexibility is lacking in the conventional type of hinge service clamp. Another advantage of the present invention results from the screws 58 and 56 being respectively retained in their relative saddle parts 14 and 16 during assembly, and for that matter during shipping of the saddle clamp. This prevents loss of the bolts, either during shipping or assembly. The arrangement of the service clamp 10 of the present invention further provides for a clamp capable of use with main pipe varying slightly in diameter.

The terminology used throughout the specification is for the purpose of description and not limitation, the scope of the invention being defined in the claims.

What is claimed is:

1. A service clamp for tapping a hole in a main pipe and/or supporting a branch pipe, said service clamp comprising:

a first saddle part having a curved surface substantially complementary to a portion of the surface of the main pipe and having a flange extending outwardly from each end thereof, each flange having an unthreaded aperture therethrough, and said first saddle part having a slot therethrough opening to said curved surface and communicating with one of said unthreaded apertures, said slot being wider than said one aperture;

a second saddle part having a curved surface substantially complementary with a portion of the surface of the main pipe and having a flange extending outwardly from each end thereof, each of said flanges having a threaded aperture therethrough, said first saddle part cooperating with said second saddle part to embrace the main pipe therebetween with their respective flanges opposing one another and apertures in the opposing flanges being aligned with each other;

a radially extending branch pipe extension on one of said first and second saddle parts and defining a through-bore opening to the curved surface of the same;

sealing means carried by the one of said first and second saddle parts having said branch pipe extension and arranged to seal around a hole tapped in the main pipe; and clamping means for clamping said first saddle part to said second saddle part on the main pipe, said clamping means including a first screw having a head, said first screw being partially threaded into the threaded aperture in one flange of said second saddle part which is to be aligned with the unthreaded aperture of the opposed flange of said first saddle part which is in communication with the slot therein, means for staking said first screw to prevent the same from being unthreaded from the threaded aperture, and a second screw having a head and extending through the unthreaded aperture of the other flange of said first saddle part, means for retaining said second screw in said unthreaded aperture of the other flange of said first saddle part prior to assembly of said first saddle part and said second saddle part about the main pipe, said first screw having its head arranged to slip through said slot and bear against said one flange to provide a hinge between said first saddle part and said second saddle part when said saddle parts are being assembled about said main pipe, both of said screws then being capable of being tightened so that their heads bear on the respective flanges of said first saddle part to apply a uniform load on said sealing means.

2. A service clamp as claimed in claim 1 in which said means for staking said first screw in the threaded aperture of said second saddle part is a flared end on said first screw.

3. A service clamp as claimed in claim 2 in which said means for retaining said second screw in place in the unthreaded aperture of said first saddle part prior to assembly of the clamp is a plastic disc of greater diameter than said unthreaded aperture and having a hole therethrough about the same diameter as a root diameter of said screw.

4. A service clamp as claimed in claim 1 in which said means for retaining said second screw in place in the unthreaded aperture of said first saddle part prior to assembly of the clamp is a plastic disc of greater diameter than said unthreaded aperture and having a hole therethrough about the same diameter as a root diameter of said screw.

5. A service clamp as claimed in claim 1 in which said branch pipe extension is positioned on said first saddle part.

6. A service clamp as claimed in claim 5 in which said curved surface of said first saddle part is provided with a groove circumscribing the opening of the through-bore to the curved surface and in which said sealing means includes an elastomeric sealing ring carried in said groove.

7. A service clamp as claimed in claim 6 in which said second saddle part is an arcuate-shaped strap having the flanges at each end thereof the threaded apertures therethrough.

8. A service clamp as claimed in claim 7 wherein said means for retaining said second screw in the unthreaded aperture of said first saddle part prior to assembly of the clamp is a disc having a diameter greater than the unthreaded aperture and a hole therein having a diameter substantially equal to a root diameter of the second screw.

* * * * *